Feb. 18, 1936. C. R. C. BORDEN 2,030,911
WASHING AND LATHERING SPONGE DEVICE
Filed Dec. 9, 1933 2 Sheets-Sheet 1
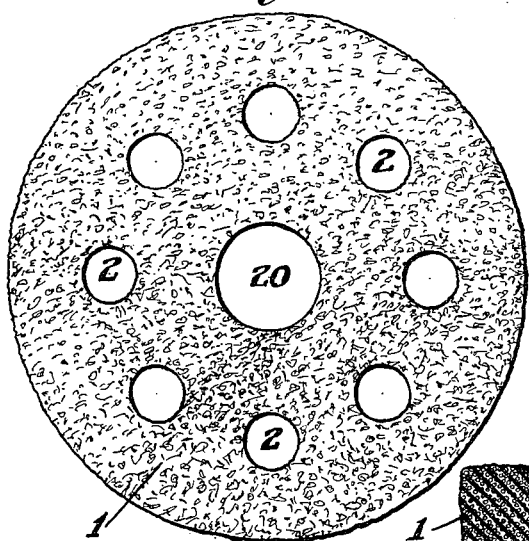
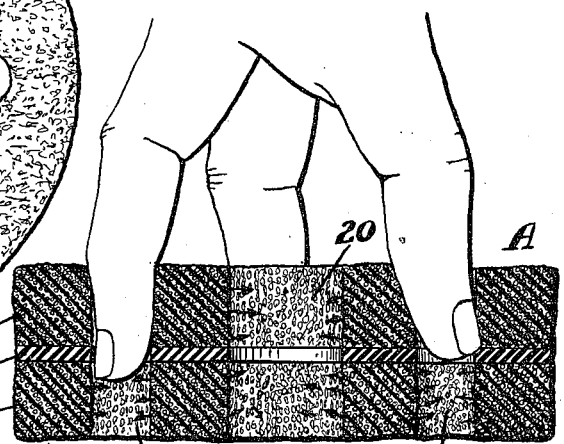
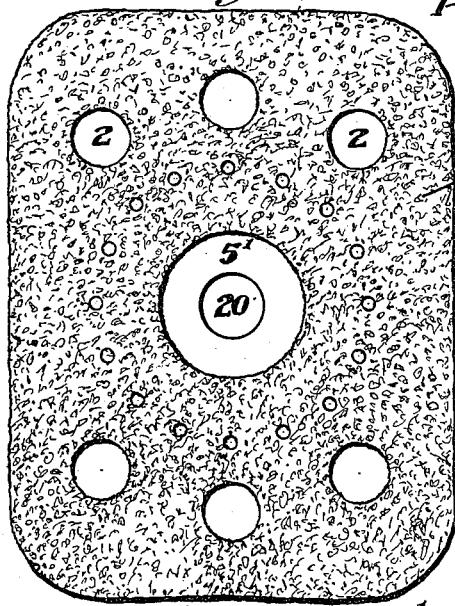
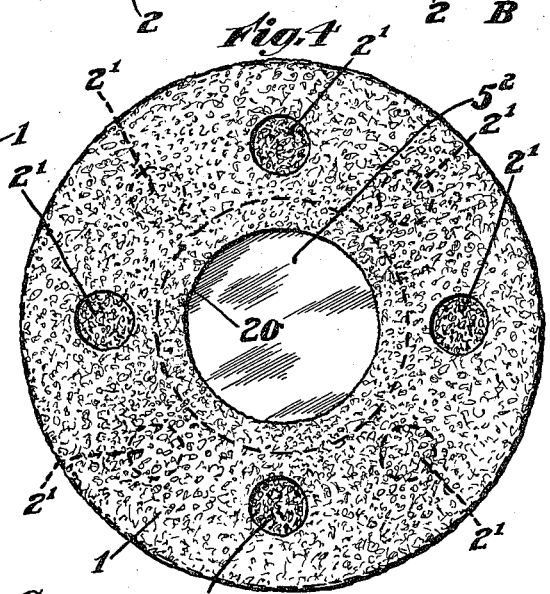
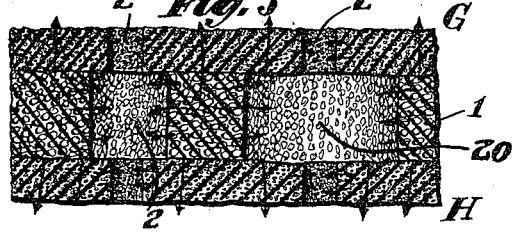
Inventor
Charles R. C. Borden
Ellis Spear
By Attorney Feb. 18, 1936.　　　C. R. C. BORDEN　　　2,030,911
WASHING AND LATHERING SPONGE DEVICE
Filed Dec. 9, 1933　　　2 Sheets-Sheet 2
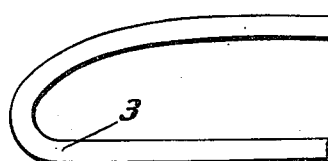
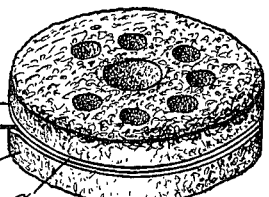
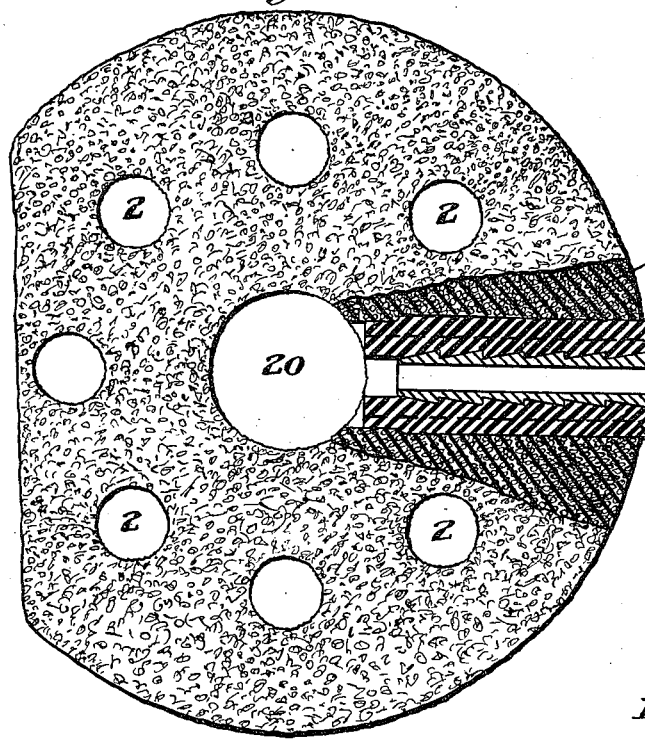
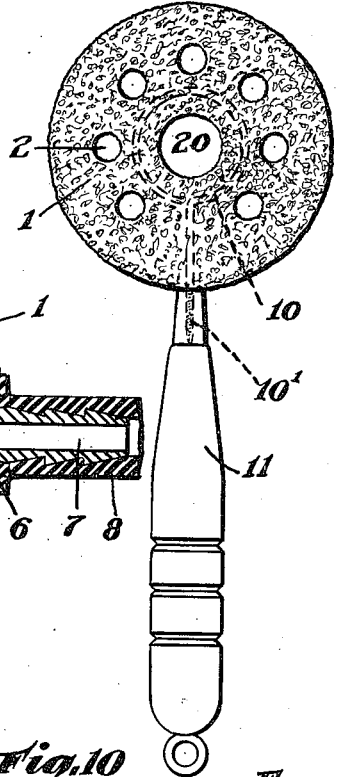
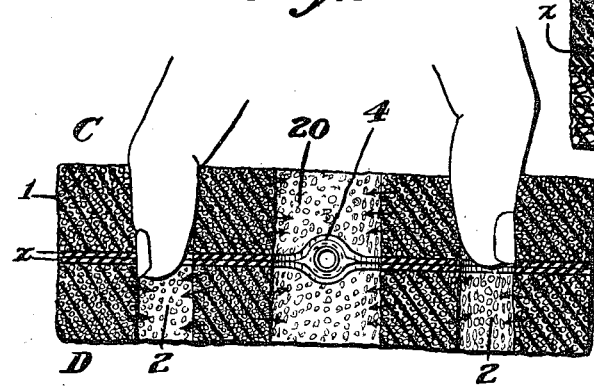
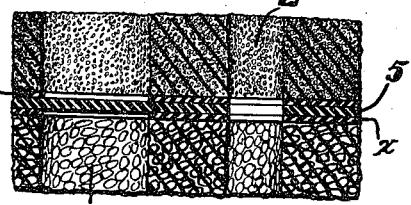
Inventor
Charles R. C. Borden
By *[signature]*
Attorney Patented Feb. 18, 1936

2,030,911

UNITED STATES PATENT OFFICE 2,030,911

WASHING AND LATHERING SPONGE DEVICE

Charles R. C. Borden, Brookline, Mass.

Application December 9, 1933, Serial No. 701,653

3 Claims. (Cl. 15—244)

My present invention herein to be discussed relates to improvements over my previous developments in artificial washing devices of sponge-like character. In this phase of my development I am particularly concerned with structural features. Of these there may be various physical embodiments but they are all potentially possible according to the basic idea of drainage, drying and discharge.

As commonly sold, the solid block type of sponge possesses three objections in addition to its reluctance in drainage and drying, each of which is a serious fault. These are, in the order of their importance (1) when filled to their water capacity, they are needlessly heavy for the purpose for which they were designed; (2) they are either too limp or too springy to grasp by the hand for any length of time; and (3) they retain altogether too much (or too little) water for certain purposes.

According to one phase of my concept I cut away much rubber tissue previously believed indispensible or by cut-aways I make more cell capacity available. By thus removing much of the rubber tissue in selected locations or by making it more available I have been able to greatly improve the block type sponge by practically eliminating its objections previously named.

Sponges are occasionally used to "sop up" water. For this purpose the more water absorbed and lifted away the better. On the other hand, for the purpose of scrubbing, which is one of the most common functions of sponges, too much absorbed water is a decided fault. All water that flows away from a sponge on slight pressure is wasted water from a scrubbing standpoint, hence needless effort is expanded to lift it from the pail or tub and have it flow away without having performed useful service.

In a common sponge of larger diameter, many pounds of useless water are lifted from the pail in such heavy duty as washing large windows, floors, automobiles, etc. whereas with my improved sponge, of equal size, much such needless waste of energy is eliminated.

Another decided objection to an over-filled sponge is its tendency to "spatter" water when in use. This evil is partly a matter of excess weight. The saturated sponge being quite heavy requires distinct muscular effort to lift it from the pail and carry it to the surface to be scrubbed. The quick action causes the over-filled sponge to meet the cleaning surface abruptly, hence the sudden contact causes the free water to bound back in all directions, thereby wetting not only the arm but often the clothing of the worker.

Spring tension is important because the commercial success of any rubber sponge hinges considerably upon this point, for it as much as any other reason, decides whether or not it is efficient and comfortable to use.

If spring tension is too little, the sponge is a flimsy, floppy article which does not perform satisfactorily. If spring tension is too great, hand and finger fatigue is present to a marked degree.

A good rubber sponge device must remain close to the surface being scrubbed regardless of whether such surface is irregular or uneven. It must do this moreover in corners, angles or furrows. To perform in this manner real spring tension is necessary up to and beyond the point at which hand fatigue would be present if the sponge required full hand pressure to apply it to its duty.

To retain full spring tension in my improved sponge I have added to the block type certain new features which entirely change the method of holding the sponge and eliminate hand fatigue entirely. By this invention I have practically transferred all muscular effort in scrubbing from the hand and fingers to the fore arm and in so doing use muscles which are not easily tired.

The relationship of thickness and spring tension in a sponge is very close. "Sopping sponges" require little or no spring, but in scrubbing sponges the necessity for spring tension increases somewhat as thickness decreases. In general, the thinner a sponge can be made and still retain its good features, the better. It is lighter, can be more easily manipulated, holds less water and more soap. It costs less, takes up less space, dries more rapidly and because of its astonishingly rapid cleansing action is all that is required for almost any purpose except where very large surfaces, as in the case of an automobile, are to be cleaned.

By removing a substantial central core and developing my duct systems symmetrically with relation to it, I get a great increase in the area of exposed cut cells depthwise of the article. This makes possible radial movements of the water and suds in addition to their movements to and from the contact surfaces. When such a sponge is applied to the body or other surface to be washed this large central aperture becomes a suds reservoir supplying lather centrally of the sponge. Again, in another form of my invention, I utilize it as a distributor area for rinse water fed to it by a pipe or tube. Also, this coring of the sponge reduces finger fatigue by making the article less elastic and jumpy and by making the ducts of sufficient size they become finger tip engagements. These and other features will be more fully discussed in the specification that follows and illustrative embodiments shown in the accompanying drawings. In the drawings:

Fig. 1 is a face view of disk type sponge device.

Fig. 2 is a sectional view of such device indicating finger control.

Fig. 3 is a face view of a device of modified structure suggesting the feature of marking possibilities.

Fig. 4 illustrates a disk type sponge of similar character but of different construction.

Fig. 5 is a sectional view of a portion of a device further modified.

Fig. 6 is a view of water fed device.

Fig. 7 is a face view partly sectioned of a heavy duty sponge and connections partly sectioned to show attachments.

Fig. 8 is a sectional view of such sponge.

Fig. 9 illustrates a type of device with handle, and

Fig. 10 a fragmentary variant providing opposite coarse and fine surfaces.

Referring first to my slab types of sponge devices I would state at the outset that while the circular form shown in the drawings is of great advantage the term as used herein is not intended to be limiting except as expressly claimed, as the exact form or contour may be varied. The advantage of a circular, octagonal, hexagonal or like figure whose contours are symmetrical with relation to a cored out center, is that in use uniformity of absorption and extrusion of lather and water, as well as pressures of application to the body or surface to be washed, are all important as will be more fully discussed later. The materials of my sponge members are porous rubber 1 of the type commonly known as sponge rubber.

As fully discussed in my previous Patent No. 1,943,365, granted January 15, 1934, of which my present application is a continuation in part and the concept a development, sponge rubbers while having many advantages over the natural or sea sponge had the defect of internal pore constriction.

It is most desirable for most purposes that the surface pores of the sponge material 1 be fine, although according to my invention, I provide for some types with different degrees of fineness or coarseness on the two faces (see Fig. 10). In most sponges the internal pores are small and merely punctured and they fill slowly and deliver slowly and do not dry well for a very long time.

In carrying forward my original concept, it developed on several lines. One simple but very practical development was that by providing a sponge device substantially symmetrical with reference to a center, there could be a large center chamber or well 20 which would provide a radially effective central chamber for the suds and aid drying on the same radial basis.

In scrubbing, this central chamber or well 20 provides a suds supply which can work outwardly or inwardly under the contact surface and is a factor of highest efficiency as will appear in my discussion. About this center I preferably cut a series of ducts 2. These I preferably distribute so that they will be not closer together than their major transverse dimension, or, in the case of round ducts, than their diameters. This as a general rule gives maximum efficiency but may be varied in some instances for special effects.

As indicated in Figs. 2 and 8 by making these ducts 2 of proper size they constitute finger engagements so that the sponge can be moved over the surface being washed with a minimum of fatigue. The sponge is not squeezed as by the grasp of the hand, but can be lightly pressed to the work and moved and guided with only a minimum of effort. In this structural form the suds charge lasts longer and is more efficiently applied and the sponges require less frequent dippings.

Furthermore, the large central aperture 20 and ducts 2 make it possible to reduce the sponge body without in the least reducing surface contact efficiency. In fact, the edges of the central orifice and ducts which as before described are normally open, act as lips or wipers. In this way I provide for the regulation of the amount of water to be taken up each time the sponge is dipped. There is no excess weight of water and no dripping or spattering as in ordinary sponges. The reduced internal sponge cell volumes actually suck up and tend to retain more water or suds and make it more available than the larger cell volumes of the old unvented rubber sponge. Obviously, the sponge cells will be cleansed, purged and dried with increased efficiency and rapidity.

Reverting to the finger engagement function of the enlarged ducts it is desirable to have an easy finger fit or one that will only slightly expand the duct 2 as indicated in Fig. 2. However, when the duct walls are wet and slippery there is a tendency for small, slender fingers to push through. To overcome this I capitalize my concept of a central web or splint 5. The apertures 2 may be, if desired, of slightly smaller size or diameter but due to the expansion of this rubber material I am able to get a thimble-like effect with the same size of hole as the original size of the duct 2. This is in addition to the internal lateral stiffening effect of the splint 5. It is usually convenient to cut the openings in the sponge or sponge assembly by a punch or die. The apertures may, however, be formed in the splint 5 before assembly. It will be understood that only a relatively slight resistance is needed to discourage over-pressure on the finger.

The finger tips may penetrate and so engage the web or splint 5 without slipping through to the opposite contact surface. This is preferably accomplished by making the splint 5 of a slightly harder rubber or stiffer rubber mix. Such a splint adds a lateral stiffening without destroying flexibility and makes the sidewise movement of the sponge decidedly more effective and easy. It does not obstruct the free drainage or extrusion function of the duct. The ducts are preferably of sufficient number so that if several fingers are inserted there is still sufficient cut cell areas to afford ample extrusion. The rubber slabs such as are identified generally as A, B, in Fig. 2, in which they are shown with no skin, or as E, F, in Fig. 10 where they have the mould skin $x$ may be cemented or otherwise attached to the splint 5.

To overcome the various objections due to excess amount of water, frequent dipping, weight, splattering, etc. previously mentioned, I have further added to my sponge structures as shown in Figs. 6 and 7, a hollow rubber tube 3 which is light in weight and sufficiently pliable to bend easily in any direction. One end of this tube 3 is anchored as at 4 as in Fig. 8, between the layers C, D, of the sponge body in such a way that the distal open end of the tube 3 opens without restriction of any kind into the centre opening 20 in the sponge body, and not into the sponge material itself.

The other end of the tube 3 is furnished with any suitable connection to a faucet at the bath tub or to the end of a common hose in the case of the automobile sponge. In the automobile type, as shown in Fig. 7, a heavy rubber tube 6 is anchored in the sponge body. The tube 8 may be connected to the anchored tube 6 by a metal coupling 7. At the hose connection with the sponge tube 8 a simple valve (not shown) may be introduced in order that the flow of water may be regulated at this more convenient location. In the bath tub type (Fig. 6) such a valve is unnecessary.

By attaching this tube connection to my sponge to a constant supply of running water, I have provided a cleansing apparatus which is of highly efficient character. The constant gentle flowing film of water thus obtained is just sufficient for the purpose and no more. There is no spattering of water back onto the clothing. The floor or surface under the automobile is not flooded with water as is the case when the common garden hose is used in the usual way. The friction surface of the sponge is just right to remove all dirt and oil film dust from the car and for some reason which I cannot explain, the car surface does not need to be chamoised afterward as it will dry without streaking and with perfect luster. When soap is freely rubbed on this sponge a large amount of soap suds appear throughout the sponge body but the running water has no tendency to wash them away. Hence, we have pure clean running water and abundant soap suds apparently working together without mixing to any great extent.

A most striking and valuable feature in the washing of automobiles is the freedom this sponge combination possesses from the gathering of grit. The value of this particular phase of automobile washing cannot be over estimated. Use under varied conditions has proved that grit will not accumulate in this improved sponge even when it is used on the underside of the mudguards.

My new and improved sponge structure if mounted as shown in Fig. 9 upon a suitable handle 9 makes an ideal dish or like mop. The friction of the rubber surface, together with the added friction of the lips surrounding the openings, cleans dishes rapidly and thoroughly. The soft nature of the rubber, together with the spring tension of the sponge allow this mop to enter all depressed and irregular surfaces and instantly resume its normal shape. In this respect it is much better than dish cloths or string mops now in use. Grease and foreign matter will not stick to it because of the through and through drainage of the ducts which keep it sweet and clean at all times.

To construct this dish mop I preferably mount a stiff metal ring 10 with a metal shaft 10' embedded between the two layers of sponge rubber. When the layers are cemented or vulcanized together the metal ring becomes firmly included in the sponge body. A thread 10¹ is cut on the end of the shaft which is part of the metal ring. The shaft is then screwed into any suitable handle 11.

The ducts 2 should be for highest efficiency spaced according to their size and their relation to the central opening 20 so as symmetrically and uniformly to drain the areas between them. Obviously, no rule can be laid down as sponges will or ought to vary in thickness and in cell capacity. For different finenesses of sponge rubber, i. e. relatively larger or smaller or finer cells according to the use intended, the ducts will vary in size or diameter and in spacing.

While I do not recommend the subordination of scientific efficiency to commercial advantage, the ducts 2 can be so placed as to spell out a word or present a symbol of commercial or advertising advantage. It is also possible to imprint or form words or symbols on the splint 5 which as shown in Fig. 3 may be exposed in the chamber 20. Thus in Fig. 3 the inner splint 5 is slightly exposed as at 5¹. On this portion might appear any contrasting color, symbol or words for display for advertising purposes. This idea is carried further in Fig. 4. In that figure I have shown a splint carried full across as at 5². This might be utilized for the above purposes, but illustrates another and very important structural development.

My open venting of the cellular structure and particularly the central suds chamber is of such high efficiency that in developing my concept I found it possible to develop a new factor. The open suds cell 20 is for many uses entirely satisfactory. However, I discovered that for dermatological and bacteriological results it was possible to drive the fine suds provided by the small cells into the skin. In some types of my sponges, therefore, instead of carrying the chamber or opening 20 through the device I have deliberately divided it or blocked it off as by using the splint 5 as an imperforate member in whole or in part. That is, as shown in Fig. 4, the splint 5 instead of having an aperture as in other figures is imperforate or carried across as at 5². This does not seriously or materially affect the drainage and drying but makes a bottomed chamber instead of one open at both ends. Such a part as 5² being itself resilient acts, under the compressions of rubbing, as a diaphragm, making the opening 20 a suction and compression chamber. This may be carried to the ducts 2, if desired. It is merely necessary to balance the suds supply and delivery to any given problem whether that of personal toilet or extreme automobile efficiency and technique.

In this connection I offer another variant. In Fig. 5 I have shown a combination in which my previous concept is reflected. In this figure which is rather imperfectly illustrative, I provide outer layers G, H, on an internal splint of sponge rubber such as I. In such a structure the outer layers G, H, may be finer and as shown the openings 2¹ may be smaller and thus check the supercharge of suds which my vented sponge material generates.

In Fig. 5 I have simply tried to indicate the possibilities of the internal capacity of one of my devices with a controlled outlet of suds. The reserve capacities of the cells when vented are enormous. The ability of the pores to take up lather has not been appreciated. Its germicidal and skin pore cleansing power has been suggested but not applied. The suggestion of Fig. 5 is that of reserve suds capacity plus surface dispersion. The inner body of the material generally indicated as I supplies the outer and generally finer cell structure with suds for surface working efficiency.

I have illustrated still another variant in Fig. 10. For different uses it is desirable to have the surfaces of such devices of different degrees of fineness or coarseness. For example, in a toilet sponge it may be desirable to have one surface very soft or with very fine exposed pores and another surface more rough and frictional as with coarser exposed pores.

According to my invention it is not necessary to use two separate devices. As shown in Fig. 10 I may use a fine soft slab E on one side and a coarser slab F on the other. As a suds generator, carrier and exuder, the device works as a unit because it is generally porous throughout. Whichever surface is used the full depth of the sponge structure operates and the slabs supplement and back up each other with their individual capacities. In this figure I have shown a splint 5 as well as skin surfaces x but such a sponge will dry out rapidly and completely. Moisture dries out radially both to the center opening 20 and the outer edge and transversely through the ducts 2.

Finally but importantly, my present concept provides a further new combination. This is perfectly consistent with and is in fact a demonstration of my original basic concept.

In most washing devices the through and through ducts are very important, but another and for some purposes a most valuable function is served by the closed chamber or bottomed suds receiver, dividing the flow of suds and more compressively applying the suds to the skin or other surface. For this, to avoid repetition of figures I have made Fig. 4 composite. It shows the internal splint 5² as a diaphragm for surcharging the suds in the central cell 20. The other possibility is that of a cellular blocking off instead of an impervious strip. I may provide by a simple staggering of the vents 2 of the two slabs, to form opposed bottomed pockets 2¹.

These are definite cellular incisions of the body cell structure to or through the skin x if present, but they are thus used, in combination, by staggering the ducts to bottom the cup so formed.

The types shown are useful and efficient and illustrate the wide range of variants made possible by my invention. The suds chambers may be used alone or with ducts and all arranged and proportioned to give almost any kind of a washing device for any purpose desired.

What I therefore claim and desire to secure by Letters Patent is:—

1. A sponge rubber lathering and washing appliance comprising a body of porous sponge rubber having approximately flat contact faces, said body having distributed in substantially its entire area a plurality of normally open ducts which extend therethrough from face to face, and said body having a relatively large central opening extending through said body in radial venting and drying relation to the rest of the sponge body.

2. A sponge rubber lathering and washing appliance comprising a body of porous sponge rubber having an approximately flat face, said body having distributed over substantially its entire area a plurality of normally open ducts which extend therethrough from face to face, said ducts being spaced apart from each other a distance greater than the maximum cross sectional dimension of a duct, and an interposed layer of stiffer material to which the inner faces of the slabs are united, said body having a relatively large central opening extending through said body in radial venting and drying relation to the rest of the sponge body.

3. A washing device comprising a substantially disc like body of cellular rubber having an external contact face of exposed open pores and having an internal cellular structure of generally restricted cells, said body having a central opening in intersecting relation to the internal cells thereof, and a conductor tube extending radially through the cellular rubber body and discharging directly into said central opening.

CHARLES R. C. BORDEN.